March 11, 1958  HIROSHI SUZUKAWA  2,826,118
LENS MOUNT FOR INTERCHANGEABLE PHOTOGRAPHIC OBJECTIVES
Filed June 14, 1956

INVENTOR.
HIROSHI SUZUKAWA
BY
ATTORNEY

United States Patent Office 2,826,118
Patented Mar. 11, 1958

2,826,118

LENS MOUNT FOR INTERCHANGEABLE PHOTOGRAPHIC OBJECTIVES

Hiroshi Suzukawa, Meguroku, Tokyo, Japan, assignor to Canon Camera Company, Inc., Tokyo, Japan, a corporation of Japan Application June 14, 1956, Serial No. 591,395

Claims priority, application Japan November 30, 1955

5 Claims. (Cl. 88—57)

This invention relates to a lens mount for attaching interchangeable objectives to cameras and the like.

An object of this invention is to eliminate the disadvantage, when mounting a lens of long focal length, that the light rays projecting to each corner of the image plane are obstructed by the internal threading of the base plate, affixed to the camera, for the mount.

A clearer concept of the scope and purpose of this invention may be obtained from the following description, taken in connection with the attached drawing, in which.

The camera body has affixed thereto a mounting ring or base plate 1 adapted to receive interchangeable lenses of which the barrel ends are threaded or provided with bayonet type lugs at the camera end of the lenses. To enable attachment of lenses with threaded barrel ends, the mounting ring is internally threaded only at two segments, namely an upper and a lower segment bounded by chords parallel, and closely adjacent, to the upper $a$ and lower $a'$ horizontal sides of the rectangular focal or image field and the arcs of the central aperture of the mounting ring subtended by these chords. The left and right sides of the central aperture are cut away between the upper and lower threaded segments 2 to such an extent that when a lens having a threaded barrel end is screwed into the mounting ring until the end of the lens barrel is tight against the face of the mounting ring, no light will leak through these cut away portions into the camera.

Figures 3, 4:
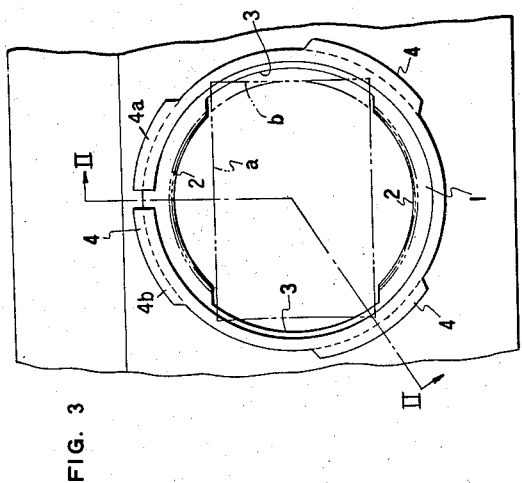
Figs. 3 and 4 are front views of said lens mount viewed from the camera body side and the lens side respectively.

The side of the mounting ring 1 towards the objective lens is provided with a plurality of spaced lugs 4 extending radially outward, for example four in number as shown in Figure 3. A pair of the lugs 4a and 4b, at the upper region of the mounting ring are relatively close to each other and symmetrically spaced, for example, from the vertical diameter of the mounting ring and are each of a circumferential length less than the two other lugs while the total length of the pair including the space between them exceeds the circumferential length of such two other lugs. The midpoint of the two other lugs 4 may be at some 120° from the middle of the space between the upper lugs 4a, 4b.

To attach to the mounting ring 1 a lens of long focal length and to avoid any obstruction of the light rays into the corners $b$ of the rectangular field of view, the stepped lens barrel 5 of such lens is provided with external threading on an intermediate step 8 thereof and an internally threaded ring 7 is screwed thereon. An annular flange 9, integral with ring 7 at an intermediate portion, extends inwardly a radial distance from the inner surface of the ring a distance such that it clears end step 9 of the lens barrel but not intermediate threaded step 8. The end face of step 9 has a pin 11 extending therefrom which is of a diameter sufficiently small to pass into the space between lugs 4a and 4b of base plate 1. The base plate end of threaded ring 7 is provided with a plurality of inwardly extending lugs 6 positioned circumferentially so that when pin 11 is positioned in the space between lugs 4a and 4b, lugs 6 will register with the spaces between each of the other lugs 4 and between such lugs and the pair of lugs 4a, 4b, while the slots 12 between lugs 6 will register with lugs 4a, 4b and 4, respectively. The pin 11 is of such height that when its free end is against the mounting ring 1 in the space between lugs 4a and 4b, the lugs 4a, 4b and 4 will lie axially behind lugs 6 in the direction away from base plate 1. The end step 9 has a groove 13 in its outer cylindrical surface extending from, for example, the bottom end of its vertical diameter clockwise (Figure 4) about 60°, in which groove a pin 14, extending through threaded ring 7, is slidable. The end of pin 14 extending into groove 13 is of less diameter than the width of the groove to permit lateral movement of the pin therein. With the lugs and pin 11 positioned as mentioned, on rotation of ring 7 clockwise as far as groove 13 and pin 14 will permit, the ring is threaded further up on intermediate step 8 (Figure 1) and lugs 4a, 4b and 4 are positioned in registration with lugs 6 and the lens is firmly attached to the camera.

Figure 1:
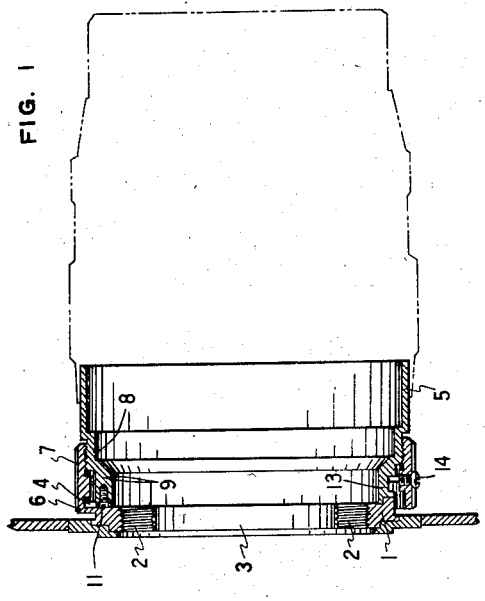
Fig. 1 is a longitudinal sectional view of an illustrative embodiment of the lens mount according to this invention assembled with a camera base plate.
Figure 2:
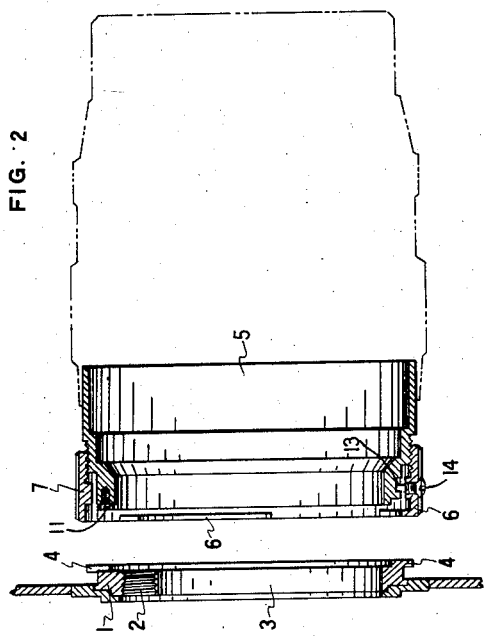
Fig. 2 is a side view of the lens mount, in longitudinal section and with its elements disconnected and spaced from each other, the base plate section being on line II—II of Figure 3, and that of the detachable coupling member on line II—II of Figure 4.

In a lens mount constructed in accordance with the instant invention the standard lens or lenses, in which the internal threading of the base plate bore least obstructs the light rays to the corners of the focal area, may be screwed directly into the threaded base plate 1. If these lenses are provided with a threaded ring 7 having bayonet lugs 6, they may be attached to the camera, as shown in Fig. 1 by inserting the lugs 4 into the corresponding slots between lugs 6 to position lugs 4 behind the plane of lugs 6, and rotating the ring 7 to interengage lugs 4 and 6. Furthermore, in the case of lenses of long focal length in general, said disadvantage in the ray-obstructed section $b$ of the image plane $a$ can be eliminated by providing the threaded ring 7. It is quite obvious that the above device is very useful for a lens mount.

What I claim is:

1. A lens mount for removably affixing interchangeable photographic objectives to a camera comprising a base plate affixed to the camera body and having a central circular bore for the passage of light into the camera, the arcuate periphery of the bore above the upper side and below the lower side of the rectangular image field being threaded, the arcuate peripheral portions of the bore between the threaded portions thereof being cut away to such an extent that on screwing a threaded lens barrel into the base plate bore the adjacent face of the lens housing will just seal the bore light tight, a plurality of radially outwardly extending lugs on the base plate side facing the lens and circumferentially spaced from each other, a fastening ring rotatable a predetermined amount on the barrel of an interchangeable lens, and a radially inwardly extending flange integral with the end of the ring adjacent to the base plate, the flange having cut-out portions corresponding to the base plate lugs, whereby on passing the lugs through the cut-out flange portions and rotating the ring the flanges and the lugs interengage to attach the barrel of the interchangeable lens to the camera.

2. A lens mount comprising base plate having a central circular aperture attached to the front wall of a camera, a plurality of lugs extending radially outwardly from the lens side of the base plate, a reference surface on the base plate axially toward the camera side relative to the lugs, a lens barrel having at least an end step and an intermediate step larger in diameter than the end step, external threading on the intermediate step, a fastening ring threaded on the intermediate step and of an axial length extending beyond the end step, an internal radial flange integral with the base plate end of the fastening ring and having cut-out portions corresponding to the base plate lugs, a spacing and positioning member extending from the end face of the end step which on engaging the reference surface of the base plate registers the cut-out portions of the flange with the lugs and positions the lugs axially away from the camera a slightly greater distance than the flange, and means permitting rotation of the fastening ring a predetermined amount in one direction to move the lugs into registration with the flange at the non-cut-out regions thereof and displace the flange axially to latch the flange at the last mentioned regions to the lugs to attach the lens barrel to the base plate.

3. A lens mount according to claim 2 in which the reference surface is a recess in the base plate in the interval between two of the lugs and the means permitting rotation of the fastening ring consist of a pin passing through the threading ring and normally positioned diametrically opposite the spacing and positioning member, and a circumferential groove in the first step having one end diametrically opposite the spacing and positioning member and its other end spaced therefrom at about an angle of 60° from its one end, the pin being of a diameter smaller than the width of the groove to permit axial displacement of the fastening ring on the rotation thereof in the lug and flange latching direction.

4. A lens mount according to claim 2 in which the segments of the base plate forming the central aperture below and above the rectangular image field of the camera are internally threaded while the portions of the base plate forming the central aperture between the threaded segments are recessed radially to just beyond the sides of the rectangular image field whereby a lens barrel having an externally threaded base may be interchangeably screwed into the base plate and seals the aperture light tight.

5. A lens mount for interchangeable lenses in cameras comprising a base plate having a circular central aperture attached to the front wall of the camera, a cylindrical sleeve in the aperture and extending axially in front of the camera front wall, an annular flange extending radially outward integral with the front end of the sleeve and spaced from the base plate, four spaced lugs extending outwardly from the outer periphery of the flange, the first and second lugs thereof being spaced close to each other and equidistant from the upper end of the vertical diameter of the base plate aperture and the third and fourth lugs having their midpoints at substantially 120° from the upper end of the vertical diameter in both directions therefrom respectively, an axial recess in the flange in the space between the first and second lugs and having a bottom surface in the sleeve substantially coplanar with the front surface of the base plate, internal threading on the sleeve in the segments thereof above and below the upper and lower sides of the rectangular field of view, the inner portions of the sleeve and flange being cut away to leave the passage of light rays to the lateral sides of the rectangular field of view unobstructed, a lens barrel having at least an end step and an intermediate step, the diameter of the end step being at least substantially equal to the longest dimension of the rectangular field of view and the intermediate step being externally threaded, a fastening ring threaded internally at its end remote from the camera and screwed onto the thread of the intermediate step, an internal annular projection at an intermediate region of the fastening ring and extending radially inward to clear the first step but to strike against the intermediate step on screwing the fastening ring tight on the intermediate step, a second annular flange integral with the camera end of the fastening ring and extending radially inward and having three cut-out portions corresponding in size and position with the first and second lugs and the space therebetween and the third and fourth lugs respectively, a pin extending from the end face of the end step and of a diameter to fit into the axial recess in the flange on the sleeve and of a length such that when its free end engages the bottom of the axial recess the lugs pass through the cut-out portions of the second flange and are positioned axially further from the camera than the second flange and closely adjacent thereto, a circumferential groove in the outer cylindrical surface of the first step from the lower end of the step diameter passing through the pin of the end step and extending in the same direction as the direction of rotation of the fastening ring when tightening the ring on the intermediate step for a distance of substantially one-sixth of the circumference of the end step, and a second pin extending through the fastening ring and into the groove and of a diameter less than the width of the groove, the second pin normally being on the diameter passing through the pin extending from the end face of the end step, whereby the threading pin may be rotated substantially one-sixth of a revolution to rotate the portions of the second flange which are not cut-out to register with the lugs and displace the second flange axially tightly to engage the lugs and attach the lens barrel to the camera.

References Cited in the file of this patent
UNITED STATES PATENTS

| | | |
|---|---|---|
| 2,052,261 | Verschoor | Aug. 25, 1936 |
| 2,136,149 | Nuchterlein | Nov. 8, 1938 |
| 2,260,991 | Gorey | Oct. 28, 1941 |
| 2,618,201 | Brohl et al. | Nov. 18, 1952 |
| 2,643,581 | Wehrenfennig | June 30, 1953 |
| 2,649,024 | Goldhammer | Aug. 18, 1953 |
| 2,715,854 | Simmons et al. | Aug. 23, 1955 |